US005979032A

United States Patent [19]

Roy et al.

[11] Patent Number: 5,979,032

[45] Date of Patent: Nov. 9, 1999

[54] TOOL FOR INSERTING A FITTING INTO A HOSE

[75] Inventors: Michael Roy, St. Brampton; Leo Poitras, Brampton, both of Canada

[73] Assignee: Chrysler Corporation, Auburn Hills, Mich.

[21] Appl. No.: 09/096,205

[22] Filed: Jun. 11, 1998

[51] Int. Cl.$^{6}$ .......... F16L 35/00

[52] U.S. Cl. .......... 29/237; 29/268

[58] Field of Search .......... 29/234, 235, 237, 29/235.5, 268, 272

[56] References Cited

U.S. PATENT DOCUMENTS

| | | | |
|---|---|---|---|
| 1,154,718 | 9/1915 | Neff | 29/268 |
| 1,179,565 | 4/1916 | Risden | 29/268 |
| 2,958,125 | 11/1960 | Nichols | 29/237 |
| 3,299,496 | 1/1967 | Christensen . | |
| 3,599,310 | 8/1971 | Brownlee | 29/237 |
| 3,969,964 | 7/1976 | George et al. | 29/268 |
| 4,108,474 | 8/1978 | Sigrist . | |
| 4,170,125 | 10/1979 | Minka . | |
| 4,257,135 | 3/1981 | Moebius . | |
| 4,519,122 | 5/1985 | Miller | 29/237 |
| 4,757,588 | 7/1988 | Churchich . | |
| 4,982,631 | 1/1991 | Lowther . | |
| 5,566,438 | 10/1996 | Bullock . | |
| 5,671,520 | 9/1997 | Scarborough | 29/268 |

*Primary Examiner*—Robert C. Watson
*Attorney, Agent, or Firm*—Lawrence J. Shurupoff

[57] ABSTRACT

A tool for inserting a hose fitting into an open end of a flexible hose includes a clamp for gripping the hose near its open end. An arm is pivoted to the clamp for swinging movement from a retracted position to an advanced position extending across the open end of the hose. The arm has an abutment adapted to press the fitting into the open end of the hose upon further swinging of the arm.

5 Claims, 3 Drawing Sheets

TOOL FOR INSERTING A FITTING INTO A HOSE

This invention relates to a tool for inserting a hose fitting into an open end of a hose.

BACKGROUND OF THE INVENTION

It can take a great deal of manual force to insert a barb fitting into the end of a hose and it can be particularly difficult to get the fitting started into the hose. What is needed is a tool which is capable of exerting the force needed to start and complete the insertion of a barb fitting into a hose and which can do so in a fast and expeditious manner.

A particular need exists for such a tool which can be used in tight spaces and can be actuated with two hands. When replacing barbed fittings in fluid lines, particularly those which are elevated and require use of a ladder to access, a need exists for a tool which does not generate a reaction force tending to push an operator off the ladder.

In accordance with the present invention, a tool is provided which has a clamp for gripping a hose near its open end. An arm is pivoted to the clamp for swinging movement about a pivot axis extending transversely of the gripped hose. The arm is swingable from a retracted position to an advanced position extending across the open end of the hose. The arm has an abutment which is adapted to press the fitting into the open end of the hose upon further swinging of the arm beyond its advanced position.

Preferably, the clamp has fixed and movable jaws, the jaws being of semi-cylindrical form and when closed cooperate in defining an open-ended radially stepped cylindrical vice for supporting and gripping the hose end. The arm is pivoted to a support bar carried by the fixed jaw of the clamp. The abutment on the arm is in the form of a half sphere facing the open end of the hose. The abutment, due to its hemispherical shape, has a smooth sliding action which facilitates the initial entry of the fitting into the hose.

One object of this invention is to provide a tool for inserting a fitting into an open end of a hose without crushing or damaging the hose.

Another object is to provide a tool which is of simple construction, is rugged and durable in use, and is capable of being inexpensively manufactured and easily operated.

Still another object is to provide a tool which can be used to connect fluid lines to automated machinery, particularly in hard to access locations such as elevated areas where a ladder is required for access.

Other objects, features and advantages of the invention will become more apparent as the following description proceeds, especially when considered with the accompanying drawings.

DETAILED DESCRIPTION OF THE PREFERRED EMBODIMENT

Figure 2:
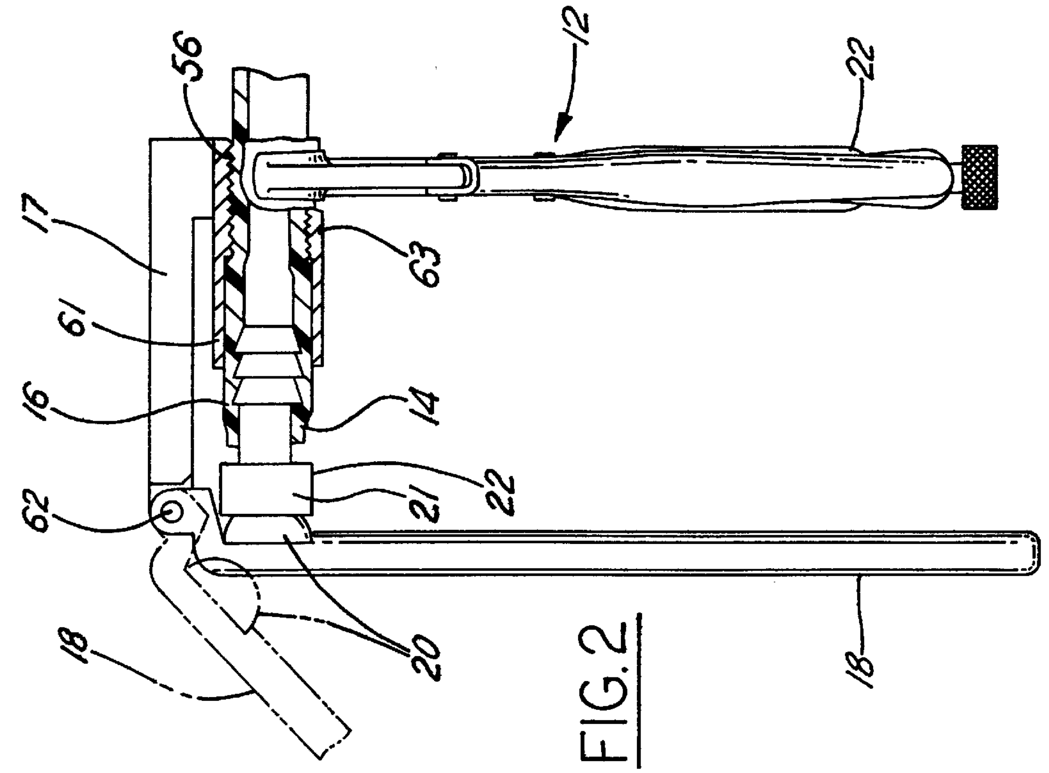
FIG. 2 is a front elevation of the tool with parts in section, showing in solid lines the arm of the tool in an advanced position and in a retracted position in broken lines.

Referring now more particularly to the drawings, the tool 10 includes a clamp 12 for releasably gripping the open end 14 of a hose 16, a support bar 17 rigidly connected to the clamp, and an arm 18 pivoted to the support bar provided with an abutment 20 for pressing against the open, ring-shaped mouth 21 of a tubular barb fitting 22 and forcing the fitting into the open end 14 of the hose.

The clamp 12 has an adjustable, locking, quick-release action for gripping the open end of the hose. The clamp includes a stationary jaw 26 rigidly secured to the upper end of a tubular stationary handle 28. A manually adjustable screw 30 is longitudinally movable within the handle 28. A second jaw 34 is mounted on a movable jaw body 35 that is coupled to the handle 28 on a pivot 36. The jaw body 35 is also pivoted by a second pivot 40 to the end of a second handle 42 which, in turn, is pivoted at 43 to a lever 44.

Figure 3:
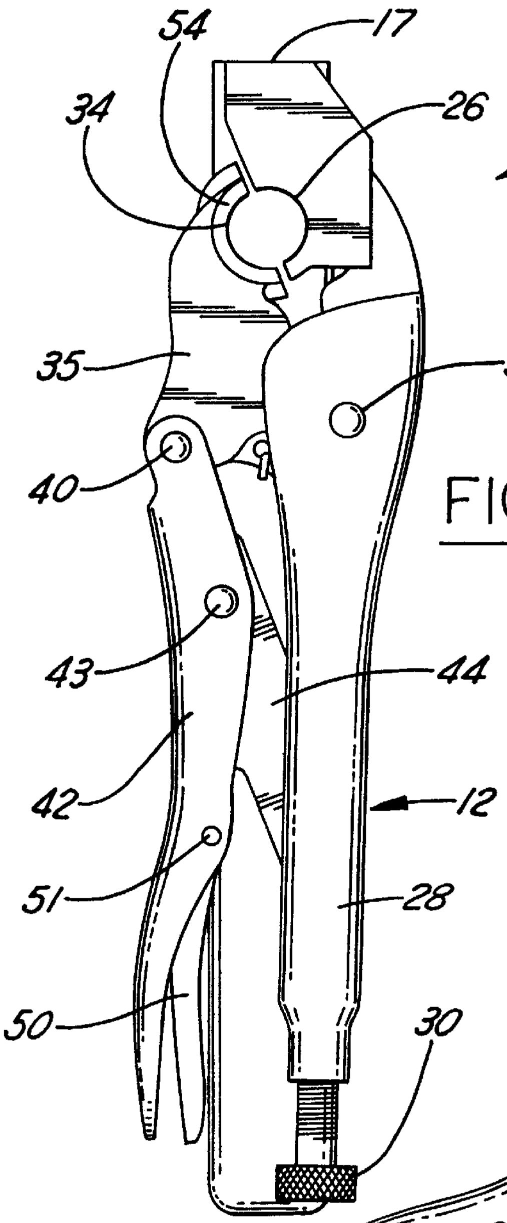
FIG. 3 is a side elevation of the tool, with the hose clamp closed.
Figure 4:
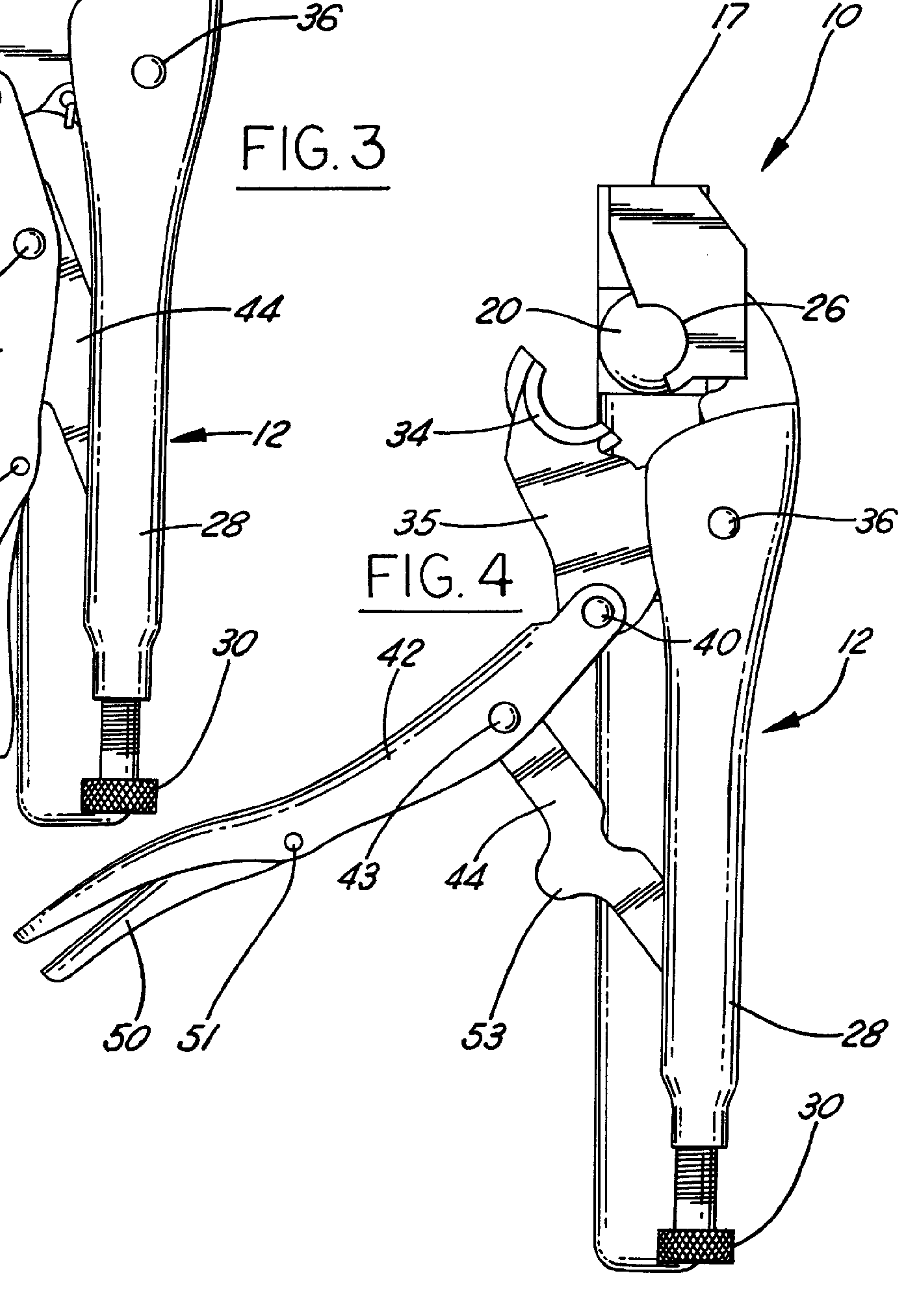
FIG. 4 is a view similar to FIG. 3 but with the hose clamp open.
Figure 5:
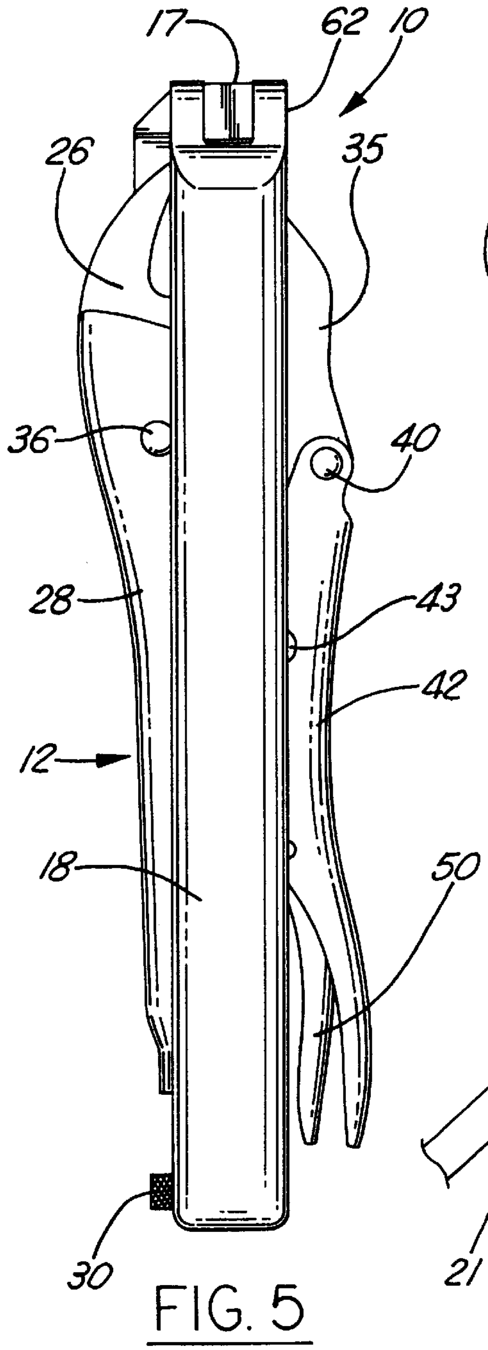
FIG. 5 is a side elevational view of the tool, taken from the side opposite FIG. 3.
Figure 6:
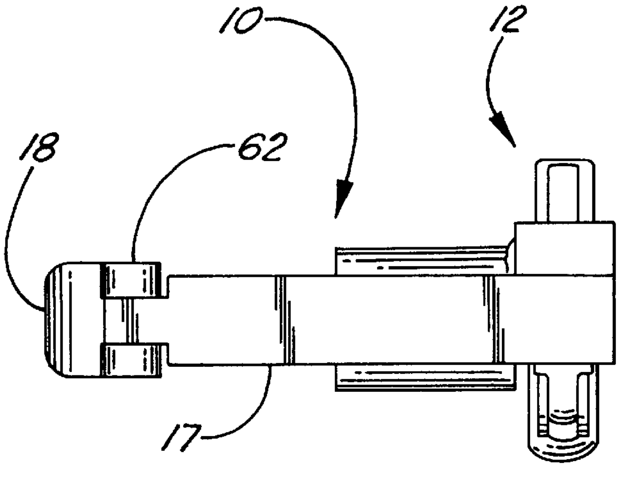
FIG. 6 is a top plan view of the tool.

The free end of lever 44 bears against the end of the adjustable screw 30 within the stationary handle 28. Pivots 36, 40 and 43 are parallel to one another. Moving the second handle 42 toward the stationary handle 28 will force the pivot 40 upward and cause the jaw body 35 and second jaw 34 to rotate clockwise around the pivot 36 to thereby close the jaw 34 against the stationary jaw 26 (see FIGS. 3 and 4).

If the screw 30 is in proper adjustment, the lever 44 will be drawn into the stationary handle 28 and the pivots on the adjustable second handle 42 will form an over-center lock which will prevent normal separation of the handles and the jaws. To provide easy opening, an opening trigger 50 is pivoted at 51 in the interior of the second handle 42 and positioned to bear against a protruding portion 53 of the lever 44 within the stationary handle 28. The trigger 50 may be slightly and easily moved to quickly pry and separate the second handle 42 from the stationary handle 28.

The stationary jaw 26 is of semi-cylindrical form, that is it is in effect a longitudinal section of a cylinder taken through the central axis thereof. The movable jaw 34 is also of semi-cylindrical form and when the movable jaw is closed against the stationary jaw the two jaws form a cylindrical vice 54 to grip the hose and hold it tightly. Axially spaced, arcuate ridges 56 on the inner surfaces of the jaws 26 and 34 increase the holding action of the jaws.

Semi-cylindrical jaw extensions 58 and 60 are rigidly secured to the respective jaws 26 and 34 to provide axial extensions thereof and increase the length of the vice 54. The central axis of the vice 54 formed by the closed jaws 26 and 34 is perpendicular to the handle 28 and to the pivots 36, 40 and 43. The cylindrical vise 54 is provided with a radially-stepped internal bore having a larger diameter smooth-walled front bore portion 61 and a smaller diameter rear bore gripping portion 63. The ridges 56 in the rear bore portion 63 grab and hold the tube 16 while the larger diameter smooth front bore portion provides a clearance to allow the hose 16 to radially expand as the barbs of fitting 22 enter the hose. This small radial clearance around the hose prevents the hose from being crushed between the barbs and the inner surfaces of the jaw extensions 58, 60 when the barbs are pressed into the hose causing the hose to radially expand.

Figure 7:
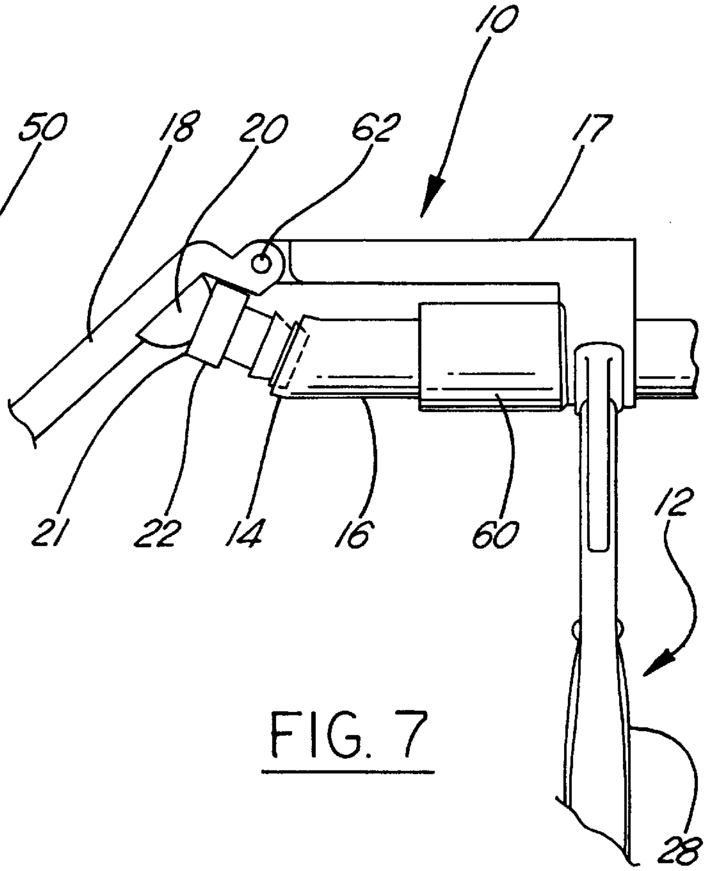
FIG. 7 is a fragmentary view of the tool showing the position of the parts as the fitting is initially forced into the open end of the hose.

The support bar 17 has one end rigidly secured to the fixed jaw 26 and extends over the top of the fixed jaw 26. The support bar 17 is parallel to the central longitudinal axis of the vice 54 and extends beyond the jaw extensions 58 and 60. A pivot pin 62 on the outer end of the support bar 17 extends perpendicular to the longitudinal central axis of the cylindrical vice 54. The upper end of the arm 18 is pivoted to the pivot pin 62 so that the arm is swingable about the axis of the pivot pin. The arm 18 is adapted to extend across the open end of the hose 16 when the hose is gripped in the vice 54 (FIGS. 2 and 7).

Figure 1:
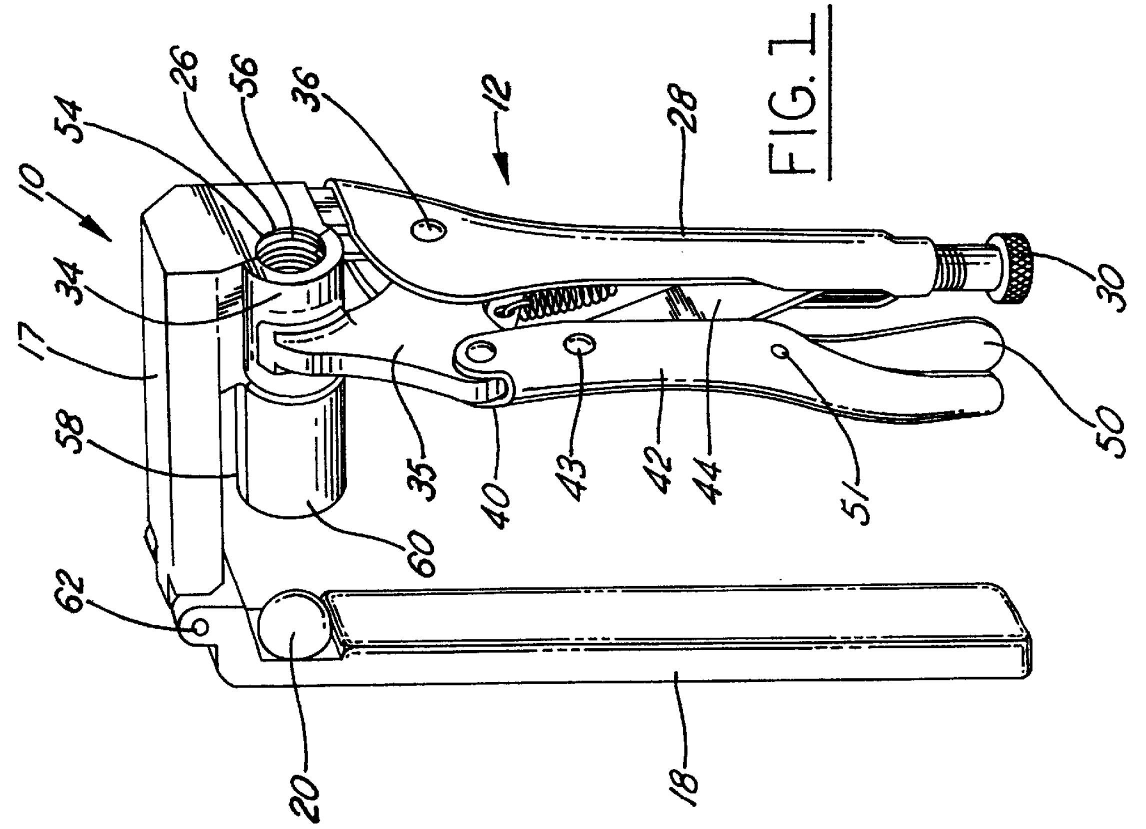
FIG. 1 is a perspective view of a tool constructed in accordance with the invention.

The abutment 20 is convex, arcuate the form of a hemisphere rigidly secured to the arm 18. When the arm 18 extends perpendicular to the central axis of the vice 54, as in FIGS. 1 and 2, the abutment is directly opposite the vice, that is, an extension of the central axis of the vice 54 extends through the center of the abutment 20.

In use of the tool, the jaws of the clamp will be open, the hose will be placed between the clamp jaws 26 and 34 and the clamp jaws will then be closed to fixedly secure the hose 16 in position with the open end 14 extending beyond the jaw extensions 58 and 60 as shown in FIG. 2. At this time, the arm 18 is retracted farther clockwise than the position shown in broken lines in FIG. 2. The arm 18 is swung counterclockwise to an advanced position shown in FIG. 7 and in broken lines in FIG. 2 in which the arm extends across the open end of the gripped hose and in which a fitting 22 placed against the open end 14 of the hose will be engaged by the abutment 20 to initiate entry of the fitting into the open end.

The convex, arcuate or hemispherical shape of the abutment 20 will have a self-centering sliding action on the fitting 22 causing it to more easily enter the hose. Further movement of the arm beyond the FIG. 7 position to the position shown in solid lines in FIG. 2 will cause the fitting to be forcibly driven into the hose by the abutment. The abutment 20 is close to the pivot axis 62 at the upper end of the arm 18, much closer than to the lower end of the arm, so that a considerable leverage can be applied to the fitting.

Because the force applied to arm 18 is counteracted by the force applied to handle 28, an operator may use the tool 10 with two hands so as not to unbalance the operator. This is of particular value when working on fluid lines which are located overhead or require access by a ladder or the like.

What is claimed is:

1. A tool for inserting a hose fitting into an open end of a flexible hose, comprising:

a clamp for gripping the hose near the open end thereof;

an arm;

a pivot joint connecting one end of said arm to said clamp for swinging movement about a pivot axis;

said arm being swingable about said pivot axis in one direction from a retracted position to an advanced position extending across the open end of the gripped hose; and said arm having an abutment thereon adapted to press the fitting into the open end of the gripped hose upon further swinging of said arm in said one direction beyond said advanced position, and said abutment having a convex surface which confronts the open end of the gripped hose in the advanced position of said arm.

2. The tool of claim 1, wherein said pivot joint comprises a support bar rigidly attached to said clamp, and a pivot pin establishing said pivot axis and pivotally connecting said one end of said arm to said support bar.

3. The tool of claim 1, wherein said abutment comprises a hemisphere having said convex surface.

4. A tool for inserting a hose fitting into an open end of a flexible hose, comprising:

a clamp having a clamp handle provided with a fixed jaw and a movable jaw;

means for moving said movable jaw between open and closed positions relative to said fixed jaw;

said jaws each being semi-cylindrical and in the closed position of said movable jaw cooperating to define an open-ended cylindrical vice for gripping the hose near the open end thereof so that the gripped hose is coaxial with said cylindrical vice;

a support bar rigidly attached to said fixed jaw;

an arm;

a pivot pin pivotally connecting one end of said arm to said support bar for swinging movement about a pivot axis extending perpendicularly to said cylindrical vice;

said arm being swingable about said pivot axis in one direction from a retracted position to an advanced position extending across the open end of the gripped hose; and said arm having a hemispherical abutment facing the open end of the gripped hose when said arm is in said advanced position adapted to press the fitting into the open end of the gripped hose upon further swinging of said arm in said one direction beyond said advanced position.

5. A tool for inserting a hose fitting into an open end of a flexible hose, comprising:

a clamp having a radially stepped bore for gripping the hose near the open end thereof;

an arm;

a pivot joint connecting one end of said arm to said clamp for swinging movement about a pivot axis;

said arm being swingable about said pivot axis in one direction from a retracted position to an advanced position extending across the open end of the gripped hose; and said arm having an abutment thereon adapted to press the fitting into the open end of the gripped hose upon further swinging of said arm in said one direction beyond said advanced position.

* * * * *